UNITED STATES PATENT OFFICE 2,082,222

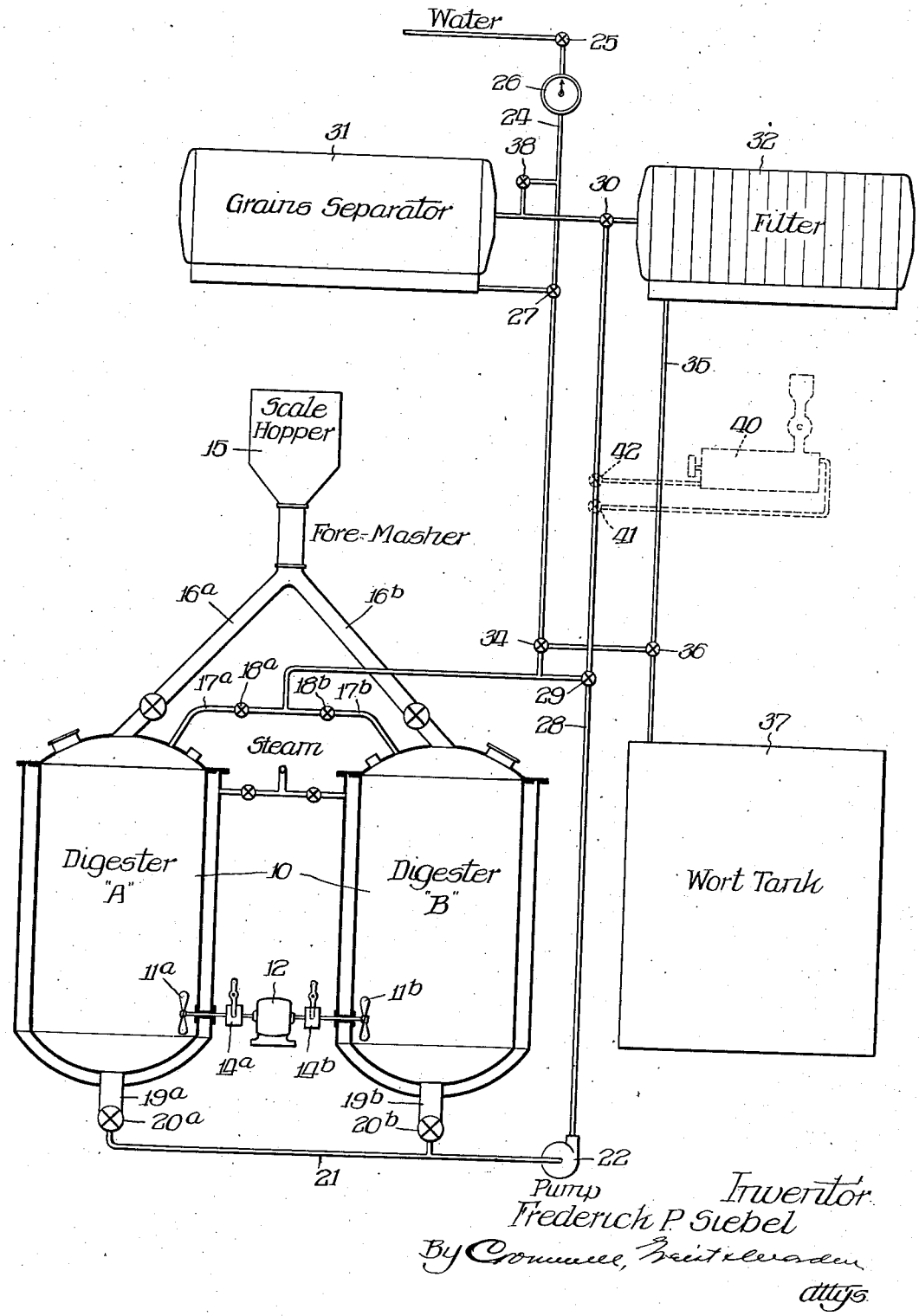

BREWING PROCESS

Frederick P. Siebel, Chicago, Ill.

Application March 22, 1934, Serial No. 716,740

8 Claims. (Cl. 99—43)

This invention relates to the art of brewing, and pertains particularly to the preparation of the wort. It is in part a continuation of my application Serial No. 671,827, filed May 19, 1933 for Brewing process.

One of the objects of the invention is the provision of a process whereby a desired wort may be produced in a condition suitable for immediate cooking, in a period of time very substantially less than is required for the mashing and sparging operations heretofore quite generally employed.

Another object is the provision of a process whereby there can be accomplished a substantially higher extraction and conversion of the desired constituents of the malt and other grains than has been the case under commercial brewing procedures heretofore generally employed; this obtaining a more complete utilization and hence a saving, in the raw materials required.

Yet another object of the invention is the provision of a process which may be carried on rapidly and with facility for preparation of a wort on a commercial brewing scale, whereby the enzymatic conversion or modification of the grain starches and albumens may be accomplished more completely and rapidly than with commercial procedures heretofore generally employed.

Yet another object of the invention is the provision of a wort-preparing process of a character such as to permit successive batches to be prepared in rapid succession one after another in the same apparatus.

Yet another object is the provision of a process for wort preparation which may be carried on under very definite and accurate control, for production of a wort of a desired character very rapidly and with very close uniformity as between different batches.

Yet another object of the invention is the provision of a process whereby the proportions of the various conversion-product constituents of the wort, such as maltose, dextrines, lactic acid, albumins, peptones, amino-compounds, etc. may be controlled with accuracy and facility.

Another object is the provision of a process for the brewing and cooking of the wort which can be carried on by apparatus requiring substantially less space and power than apparatus heretofore required for the production of an equal daily output.

Other and further objects will be pointed out or indicated hereinafter, or will be apparent to one skilled in the art upon an understanding of the invention.

The accompanying drawing serves to illustrate one form of apparatus and by means of which my improved process may be practiced. It is to be understood, however, that this is presented merely by way of illustration, as the invention may be practiced by means of apparatus other than that here illustrated and hereinafter described, and that the procedure, proportions and temperatures hereafter stated may be changed or modified in various particulars without departing from the scope of the invention.

The drawing is a schematic or diagrammatic illustration of brewing apparatus, some of the parts being shown in sectional elevation.

Following the general description of the invention, I will describe hereinafter one example of a procedure which may be followed in practicing my improved process, but it is to be understood that this is presented merely for the purpose of illustration, and is not to be construed in any fashion calculated to limit the appended claims short of the true and most comprehensive scope of the invention in the art.

My brewing process involves the use of finely ground malt. The malt preferably should be ground approximately to a fineness such that at least 90% of it will pass through a 50 mesh screen, the whole malt being ground, without removal of the hulls by preliminary polishing or otherwise, so that the acrospire will be ground and retained in the ground product. There is no necessity for avoiding fine grinding of the hulls.

In instances in which pre-cooked unmalted grains are used as malt adjuncts in some proportion to the malt, they may be employed either in the gelatinized condition, or in the flake condition.

For the preparation of a given brew or run of wort, a suitable amount of the finely ground malt, together with such proportion of malt adjuncts or unmalted grains (if used), are subjected to digestion in a quantity of water which is adequate to permit the solids, both malted and unmalted, to be maintained in diffused suspension in it by a continued stirring or circulation of the liquid. The amount of water so used in the digestion is thus substantially greater than the amount of water used in the mashing operation as heretofore generally practiced.

In the digesting procedure, the mixture of water and malt (and malt adjuncts, if used) is subjected to continued stirring, so as to keep the particles continually circulating in diffused suspension throughout the volume of water. Also, during the digesting procedure, heat is applied to the mixture in such fashion as to raise its temperature through the desired ranges at the desired rates.

In the digesting procedure, the soluble components are extracted from the malt (and malt adjuncts, if used) and modification or conversion of various constituents of the malt and malt adjuncts is accomplished, e. g., the formation of lactic acid, peptonization of albumens, saccharification or conversion of insoluble starches to maltose and dextrines. The conversion of insoluble starch and of some of the insoluble albumens to soluble form is accomplished, of course, by the action of the enzymes which are for the most part supplied by the malt. The production of lactic acid takes place most rapidly at the lower temperature ranges, e. g., about 95° F., the peptonization of albumens at a somewhat higher temperature, e. g., about 113° F., while the saccharification of starch is accomplished most rapidly at temperatures about 133° F., and the production of dextrines at higher temperatures, viz., approaching 158° F. By suitable temperature regulation, therefore, as to rate of heating and/or as to the relative periods at which the mixture is held at various stages of the temperature range, the character of the resulting wort may be quite definitely controlled. Due to the finely ground condition of the malt and due to its being kept quite thoroughly diffused throughout the volume of liquid, the enzymatic action is greatly enhanced and expedited so that the extraction of soluble constituents is accomplished very rapidly and thoroughly, as is also the conversion of the insoluble starches and albuminoids.

Since the formation of lactic acid, although most marked at the lower temperatures, continues, to a lessening extent, through some of the higher temperatures, it is important to exercise some limiting control upon it. This limitation on lactic acid formation is accomplished by expediting the extraction and limiting the contact of the mixture with air. The latter may be effected by carrying on the digesting procedure in a substantially closed receptacle which affords the body of liquid but limited air contact surface. This limitation of air contact also has a limiting effect on the oxidation of albumens. The circulation and diffusion of the malt and malt adjuncts in the liquid are maintained by mechanical stirring, and the heating may be effected by controlled application of heat to the receptacle in which the mixture is contained. It is also desirable to employ a receptacle which is substantially greater in depth than in width and to apply the mechanical stirring or circulating power at the lower portion of the liquid body, by way of aiding in maintaining the solids in diffused suspension during the digestion period.

By this procedure the digestion may be accomplished so rapidly as to extract the malt and malt adjuncts and produce a wort of suitable character in a period of from one to two hours. Thereupon the entire mixture is drawn off from the vessel in which the digesting procedure has been carried on, and is filtered for removal of the insoluble residue. The filtering may be accomplished very expeditiously and thoroughly in a filter press, a suitable inert filter aid, such as properly purified and finely comminuted kieselguhr, preferably being added to the wort liquor before filtration. The filtered wort may then be run directly to a cooker for boiling with the hops, and the balance of the brewing process then carried on in the usual fashion. The amount of water employed in the digesting operation may be of a volume representing approximately the entire amount of water to be contained in the complete run of uncooked wort, or it may be a fraction of that amount. If only a fraction of the full amount of water is employed in the digesting operation, the balance may be added by way of rinsing the container at the conclusion of the digesting operation and/or incident to other operations. If desired, at the end of the digesting operation and prior to the filtration, the entire batch may be run to a grains separator for the straining out of the spent grains.

A specific example of the process will now be described in conjunction with an explanation of the apparatus illustrated in the drawing. Let it be assumed that the installation shown is of a capacity for production of a 100-barrel brew. It includes two receptacles 10, which are designated, respectively, digester A and digester B, which receptacles are of like design and construction and have a capacity each of somewhat in excess of 100 barrels. These digesters are of substantially greater depth than width, and they are suitably steam-jacketed so that heat may be applied to their contents under proper regulation. They are equipped with suitable stirring apparatus, such as impellers $11^a$ and $11^b$, in their lower portions, which impellers may be actuated selectively from suitable power source 12 through the medium of appropriate clutch and selective speed transmission means $14^a$—$14^b$. The digesters are closed by suitably vented covers, and may be supplied with the ground malt and malt adjuncts from the scale hopper 15 through conduits $16^a$ and $16^b$. The digesters also have inlet pipe connections $17^a$ and $17^b$ controlled respectively by valves $18^a$ and $18^b$. At their bottoms these receptacles have large capacity outlets $19^a$ and $19^b$ controlled respectively by valves $20^a$ and $20^b$, through which they may be connected to discharge line 21 which leads to a pump 22.

A line 24 is arranged to be supplied with water through valve 25 and meter 26, and to supply water through three-way valve 27, to either of inlet pipes $17^a$ or $17^b$. A return line 28 which leads from the discharge of pump 22 may also be connected, through three-way valve 29, to supply liquid to inlet pipe $17^a$ and $17^b$ by way of valves $18^a$ and $18^b$. Also, through three-way valve 30, return line 28 may be connected to grains separator 31 or filter press 32. The grains separator contains screens for the straining of the grains and the hops from the wort, in the operations hereinafter described, and its discharge may be passed to line 24 through three-way valves 27 and 34. The discharge of filter press 32 may be led, by way of line 35 and three-way valves 36 and 34, to inlet pipes $17^a$ and $17^b$, or by way of valve 36 to wort tank 37. Water may be led by way of valve 38 to the inlet of grains separator 31.

Now, as an example for the making of a 100-barrel brew, 3600 pounds of finely ground malt are supplied to the digester A by way of the pipe $16^a$, together with say 60 barrels of water at a temperature of about 113° F. run in from pipe 24 by way of valves 34 and $18^a$. Impeller $11^a$ is actuated at a speed suitable to maintain a circulation of the liquid sufficiently rapid to keep the solids suspended and disseminated therein. Steam is supplied to the jacket of the digester at rates suitably regulated to hold the temperature of the mixture at about 113° F. for approximately 15 minutes, and then raise the temperature to about 150° F. in about 20 minutes with addition of about 15 barrels of hot water and 1400 pounds of suitable malt adjunct such as unmalted cooked corn flakes, and after holding it at that temperature for about 15 minutes, then raise it immediately to 158° F. and hold it at the last stated temperature for about 5 minutes. Then the entire contents of the digester, both liquid and solid residues, is rapidly run off through valve 19a to discharge line 21 and pumped by pump 22 through valves 29 and 30 to the inlet of the grains separator. After passing through the separator the liquid is discharged through valve 27 to pipe 24 and by way of valves 34 and 18b into digester B. When digester A has thus been emptied and the wort liquor thus transferred to digester B, valve 18b is closed and valves 25, 27 and 18a set to pass a quantity of water (e. g., 15 barrels) into digester A for rinsing it out. This water is then discharged through valve 20a and may be pumped either through the grains separator to digester B, to leach the grains in the separator, or directly back to digester B after appropriate setting of valves 29 and 18b. A proper quantity of a suitable filter aid (e. g., 150 pounds of kieselguhr) may then be added to the wort liquor in digester B, impeller 11b being actuated to obtain a proper dissemination of it. Then the contents of digester B is drawn off through valve 20b and, valves 29 and 30 having been properly set, is pumped through filter 32. Valve 18b having been closed and valve 18a opened, and valves 36 and 34 properly set, the discharge from filter 32 is led back into digester A. This is followed by a rinse of digester B, using about 10 barrels of water, which is run through the filter and back to digester A. The hops are added to the filtered wort in digester A, and that digester is then heated by steam to accomplish the desired cooking of the wort (e. g., for 120 minutes).

Meanwhile, after the wort has been returned to digester A, a new brew may be started in digester B, the proper quantities of malt being supplied thereto from the scale hopper 15 and proper quantity of water from line 24, as above described. When the cooking of the brew in digester A is completed, the contents of that digester is discharged through valve 20a and pumped by way of pipe 28 and valve 30 through the grains separator to strain out the hops, the grains separator meanwhile having been cleaned subsequent to the original straining of the brew. From the grains separator the cooked brew is discharged by way of valves 27, 34 and 36 to the wort tank 37, whence it may be run off to the cooler. After the cooked brew is thus discharged from digester A, that digester is rinsed out with about 10 gallons of water from pipe 24, said water being discharged from the digester and pumped through the grains separator consequent upon the closing of valve 25, and discharged to the wort tank through valves 27, 34 and 36.

The second brew, which is meanwhile started and undergoing the digesting operation in digester B, in the manner above described with reference to the first brew, is then handled in similar fashion, being passed from digester B to the pump, through the grains separator and back into digester A, where the filter aid is added; and then discharged from digester A, pumped through the filter and returned therefrom to digester B for cooking.

In the example of procedure above described it will be noted that the entire quantity of water used approximates 110 barrels, some of the water being added after the digesting treatment. It is to be understood, however, that the entire quantity of water may be mixed with the malt in the digester at the starting of the brew, such rinse water as may be subsequently employed for rinsing the digester being discharged to a drain and not combined with the wort.

By use of a filter of sufficient capacity, the straining of the wort in the grains separator preliminary to filtering may be dispensed with, and the wort passed to the filter from the digester at the conclusion of the digesting operation, the filter-aid material being added to and mixed with the wort in the digester at the end of the digesting operation, or in the course of its passage to the filter, as in a suitable feeding and mixing apparatus 40, through which the wort liquor may be passed by way of valves 41 and 42.

It will also be understood that the proportions of water and materials, and the temperatures and time periods given in the foregoing example are merely illustrative, as the process is not limited to those particular values for its effectiveness.

As compared with mashing procedures heretofore quite generally employed in commercial brewing, the above described procedure possesses several valuable advantages. One of these is a very marked saving of time. For example, with the above described procedure a suitable wort may be prepared and run into the cooker within a period of two hours from the time that the water and malt are placed in the digesting vessel, as against a period of six to eight hours heretofore required for the mashing, resting, tapping and running of a wort in the former conventional procedure. Thus it is possible to produce by it three or four brews in the time formerly required for a single brew. In addition to this time saving, further saving of time in preparation for a succeeding brew is accomplished, due to the fact that the entire mixture, including the insoluble residue, is discharged from the digesting vessel together, thus rendering the cleaning of the latter a very simple and quickly accomplished operation. In addition, the use of the above described procedure in the preparation of the wort obviates the necessity for the subsequent resting of the wort in a hop jack after the cooking.

Another important advantage gained by the above described procedure is the capability which it affords for accurate temperature control. As above pointed out, the heating is effected by application of heat to the mixture either continuously or for any periods during the digesting operation, and hence the raising of the temperature of the entire brew and the maintenance of it at selected temperature stages for definite periods may be accomplished with certainty. The facility which the present process thus affords for accurate temperature and quantity control during the digesting procedure makes possible a much more definite and certain control of the characteristics of the product accurately selective.

A further important advantage is the saving of material, which results from a more thorough extraction, conversion and utilization of the desired constituents of the malt and malt adjuncts, the elimination of losses in "under dough", and the elimination of conditions which necessitate retreatment and fractional running.

Another great advantage accrues from the fact that my improved procedure is adapted to be practiced on a large-quantity scale by very simple apparatus which involves use of but relatively little power.

What I claim is:

1. A process for brewing wort for malt beverages which comprises providing the malt in finely ground condition approximately such that 90% thereof will pass through a fifty-mesh screen, infusing the malt in a quantity of water adequate to carry it in diffused suspension, said quantity of water being not less than three times that of the malt by weight, continuously circulating the mixture to maintain the malt diffusely suspended in the liquid while heating the mixture to temperatures promotive of activity of the malt enzymes, running off the mixture of solid residue and liquid together from the heating zone, and separating the filterable solids from the liquid by filtration.

2. A process for brewing wort for malt beverages which comprises providing the malt ground to a fineness approximately such that 90% thereof will pass through a fifty-mesh screen, infusing the malt in a volume of water not less than three times its weight, applying heat externally to the mixture to heat it to temperatures promotive of enzymatic activity and meanwhile maintaining the mixture in circulation such as to keep the solids diffusely suspended in the liquid until substantially all of the starch present is converted to soluble condition, running the mixture of solid residue and liquid together from the heating zone, and separating the filterable solids from the liquid by filtration.

3. A process for brewing wort for malt beverages which comprises infusing finely ground malt in a quantity of water adequate to carry all of it in diffused suspension and form a mixture of liquid consistency, heating the mixture to temperatures promotive of activity of the malt enzymes, maintaining the mixture in circulation such as to keep the malt particles diffusely suspended in the liquid from the time they are infused therein until substantially all of the starch present is converted to soluble condition and put in solution, running the mixture of solid residue and liquid together from the heating zone, and clearing the liquid from solids by filtration.

4. A process for brewing wort for malt beverages which comprises infusing finely ground malt in a quantity of water adequate to carry it diffusely suspended therein and form a mixture of liquid consistency, heating the mixture to temperatures promotive of activity of the malt enzymes, maintaining the mixture in circulation to keep the malt particles diffusely suspended in the liquid from the time it is infused therein, adding pre-cooked starch and an additional quantity of heated water, continuing the circulation of the mixture to maintain the solids diffusely suspended in the liquid until substantially all of the starch present is converted to soluble condition and put into solution, running off the mixture of solid residue and liquid together from the heating zone, and clearing the liquid of the solids by filtration.

5. A process for brewing wort for malt beverages which comprises infusing finely ground malt and pre-cooked starch in a quantity of water adequate to carry the solids in diffused suspension therein and form a mixture of liquid consistency, heating the mixture to temperatures promotive of activity of the malt enzymes, maintaining the mixture in circulation to keep the solid constituents diffusely suspended in the liquid from the time they are infused therein until substantially all of the starch present is converted and put in solution, running off the mixture of solid residue and liquid together from the heating zone, and clearing the liquid of the solids by filtration.

6. A process for brewing wort for malt beverages which comprises preparing a fluid infusion of finely ground malt in water, heating the mixture to temperatures promotive of activity of the malt enzymes, maintaining the fluid mixture in circulation such as to keep the solid constituents diffusely suspended in the liquid from the time they are infused therein until substantially all of the starch present is converted to soluble condition and put in solution, running the mixture of solid residue and liquid together from the heating zone, adding comminuted adsorptive filter-aid material, and clearing the liquid of the solids by filtration.

7. A process for brewing wort for malt beverages which comprises providing malt in which both the husk and the endosperm are in finely ground form, infusing the finely ground malt in a volume of water adequate to carry all of it in suspension in a diffused state and form a mixture having liquid consistency, heating the mixture to temperatures promotive of activity of the malt enzymes, maintaining the mixture in circulation such as to keep the malt particles diffusely suspended in the liquid from the time they are infused therein until substantially all of the starch present is converted to soluble condition, removing the mixture of solid residue and liquid together from the heating zone, and clearing the liquid from the solids by filtration.

8. A process for brewing wort for malt beverages which comprises reducing the entire malt kernels, inclusive of the germs, husks and acrospire as well as the endosperm, to a very finely ground condition, infusing this finely ground malt in a volume of water adequate to carry all of it in suspension in a diffused state and form a mixture of liquid consistency, heating the mixture to temperatures promotive of activity of the diastatic enzymes, maintaining the mixture in circulation such as to keep the solids diffusely suspended in the liquid until substantially all of the starch present is converted to soluble condition, removing the mixture of solid residue and liquid together from the heating zone, adding a comminuted adsorptive filter-aid material, and clearing the liquid from the solids by filtration.

FREDERICK P. SIEBEL.